Sept. 18, 1923.                  C. M. RASMUSSEN                  1,468,416
                                      MUZZLE
                                  Filed Jan. 3, 1923
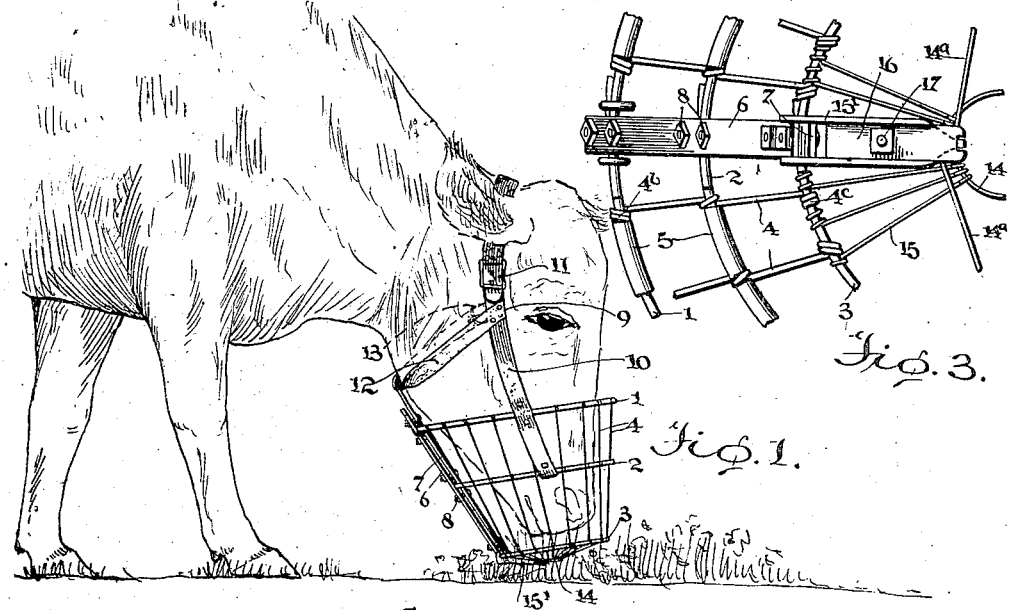
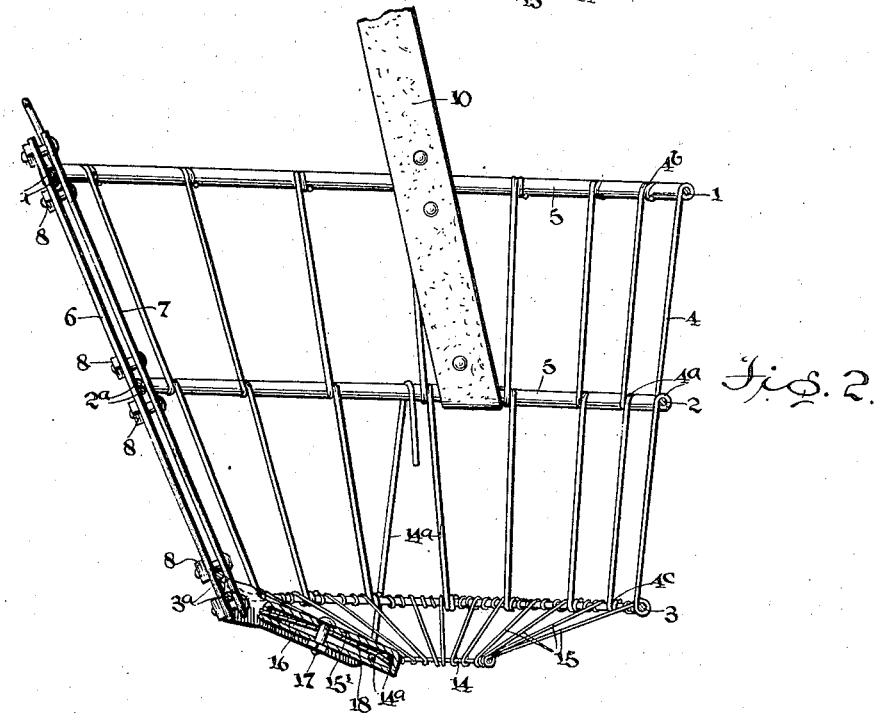
WITNESSES
R&Rousseau
                                                    INVENTOR
                                              C. M. Rasmussen
                                              BY
                                              ATTORNEYS Patented Sept. 18, 1923.

1,468,416

UNITED STATES PATENT OFFICE.

CHRIS MADSEN RASMUSSEN, OF DESCHUTES, OREGON.

MUZZLE.

Application filed January 3, 1923. Serial No. 610,454.

*To all whom it may concern:*

Be it known that I, CHRIS M. RASMUSSEN, a citizen of the United States, and resident of Deschutes, in the county of Deschutes and State of Oregon, have invented certain new and useful Improvements in Muzzles, of which the following is a specification.

My invention relates to improvements in stock muzzles, and it consists in the combinations, constructions and arrangements herein described and claimed.

An object of the invention is to provide a stock muzzle which can be adjusted at will for application to animals having heads of various sizes.

A further object of the invention is to provide a muzzle of the character described which embodies adjustable means for controlling the grazing activities of an animal to which applied so that the quantity of grass or other vegetation accessible to the animal varies as required during different seasons of the year and under different conditions for grazing so that the animal may be prevented from eating excessive quantities and consequent "bloating" of the animal thus precluded.

A further object of the invention is to provide a muzzle of the character described which is light in weight, durable in construction and which when in applied position on an animal does not chafe or bind the jaws of the animal or interfere in any way with the movement of the jaws of the animal while chewing or drinking.

A further object of the invention is to provide a muzzle of the character described which affords no place of lodgment for effluvia or excretions from the jaws or nostrils of an animal to which applied.

Other objects and advantages will be apparent from the following description, considered in conjunction with the accompanying drawings, in which—

Figure 1 is a view showing a muzzle embodying the invention in applied position on the head of an animal, Figure 2 is a relatively enlarged vertical section through the muzzle, and Figure 3 is a fragmentary perspective view showing a portion of the muzzle and illustrating the means for adjusting the muzzle circumferentially.

In carrying out my invention, I make use of a plurality of lengths of wire or like flexible members which are bent into substantially circular or slightly ovate or elliptical form to provide rings or bands such as indicated at 1, 2 and 3 respectively, the areas of said rings or bands decreasing slightly and regularly so that the area of the ring or band 1 is slightly greater than that of the ring or band 2 and the area of the latter is correspondingly greater than that of the ring or band 3. The respective rings or bands have lapped end portions which are designated $1^a$, $2^a$ and $3^a$.

The respective rings or bands 1, 2 and 3 are held in spaced axial alignment and stayed to one another by relatively stiff connecting wires 4 which are arranged in spaced parallel relation in respect to one another, each having an intermediate portion thereof encircling the wire forming the band 2 as indicated at $4^a$ and each having an end portion wrapped a plurality of times about the wire forming the band 1 and the other end portion thereof wrapped a number of times about the wire forming the band 3, as indicated at $4^b$ and $4^c$ respectively. The connectors 4 are maintained in spaced apart substantially parallel relation by means of thimbles or spacing sleeves 5 which are provided on the wires forming the bands 1 and 2 between the portions of each two adjacent connectors encircling or looped about the wires forming these bands. The lapped end portions of each of the rings or bands 1, 2 and 3 are held in adjusted relation with respect to each other by clamp bars 6 and 7 respectively between which the lapped end portions of the respective rings or bands extend and which may be releasably held in gripping relation to such lapped end portions by nuts and bolts 8 connecting the two clamp bars. The nuts or bolts 8 are preferably arranged adjacent to opposite sides of the lapped end portions of each ring or band so that each ring or band may be adjusted circumferentially independently of the other rings or bands and the lapped end portions of each ring or band will be securely held in adjusted positions in respect to each other when the nuts on the bolts adjacent thereto are tightened. It will be understood that the adjustment of each ring or band circumferentially will be effected by loosening the nuts on the bolts connecting the clamp bars, grasping the wire forming one of the rings or bands adjacent to the ends thereof and then sliding the end portions of the ring or band between the clamp bars to contract or expand the ring or band as desired.

With the organization described a network or body is presented which is adapted to receive the nose and jaw portions of the head of an animal and to be secured against displacement from the head of an animal by means of a holder or head stall indicated generally at 9 and which may comprise a holding strap 10 having its opposite ends secured to the band or rings 1 and 2 at diametrically opposite points and extending across the back of the head of an animal, the strap 10 being formed of separable sections secured together in adjusted relation by a buckle and eyelet arrangement such as indicated at 11 or like fastening means and being releasably held against displacement from the head of the animal by a band or strap 12. The latter has its ends secured to the strap 10 and also comprises separable sections adapted to be connected together by a buckle and eyelet arrangement 13 or the like.

The muzzle body is positioned upon the head of an animal so that the band or ring 3 is outermost and the muzzle body is partially closed at its outer or smaller end by a ring 14 of relatively slight area which is held substantially in axial alignment with the ring 3 by means of radially extending relatively stiff wires 15 which have their outer ends wrapped about the ring or band 3 and their inner ends encircling the ring 14.

The ring 14 is formed of a single length of wire bent intermediately substantially into circular form to provide the ring 14 and having the end portions 14ᵃ thereof extending oppositely across the outer end of the muzzle body and then being extended longitudinally of the muzzle body and hooked over one of the rings or bands thereof, as for instance over the ring or band 2. The cross portions of the wire forming ring 14 are gripped between cooperative clamp bars 15′ and 16 respectively and thus held against displacement relatively to each other, whereby the ring 14 may be adjusted to vary the area of the opening defined thereby, as required. The clamp member 15′ is substantially U-shaped in cross section and the flanges thereof are formed adjacent to its one end with aligned openings through which one of the end portions 3ᵃ of the band or ring 3 extends. The clamping member 16 is adapted to move flatwise between the flanges of the clamp member 15′ and is releasably and adjustably connected with the latter by means of bolts and nuts 17.

From the foregoing description of the various parts of the device, the operation thereof may be readily understood. The clamp members 15′ and 16 may be loosened from the crossed portions of the wire forming the band or ring 14 and the end portions 14ᵃ of the latter then manipulated to adjust the ring or band 14 circumferentially and vary the area of the opening defined thereby as required to restrict to a greater or less degree the grazing activities of an animal to which the device is applied.

The clamp members 15′ and 16 will of course be adjusted by means of the nuts and bolts 17 to hold the crossed portions of the wire forming the band or ring 14 in adjusted relation. When there is but little grass or other vegetation available, as in the early spring or late fall, the ring 14 is expanded so as to permit practically unrestricted grazing activity of the animal. When there is an abundance of grass or vegetation, as for instance when the animal is grazing in a field of alfalfa, or the like, the ring 14 is contracted to restrict the opening defined thereby so that the quantity of grass or other vegetation which can be obtained by the animal is limited and the animal is thus prevented from eating an excessive quantity of any vegetable growth which might cause "bloating" or otherwise detrimentally affect the health of the animal. The muzzle is particularly well adapted for the use of cattle, sheep and other animals which in grazing extend the tongue and draw the growing plants or grass into the mouth before biting off such plants from their stalks.

The ring 14 defining the tongue opening may be adjusted circumferentially independently of the muzzle body and the latter likewise may be adjusted circumferentially independently of the ring 14 to adapt the muzzle body for the use of animals having heads of various sizes. The rings 1, 2 and 3, the connector bars 4 binding the rings together and the spacing thimbles or sleeves 5 coact to produce a structure which is extremely strong and is braced against longitudinal, lateral and oblique distortion.

A flat spacer member 18 is interposed between the members 15′ and 16 and between the end portions of the wire forming the ring or band 14 to space said end portions apart and to provide a bearing surface on which said end portions may slide.

Obviously, my invention is susceptible of embodiment in forms other than that illustrated in the accompanying drawings and I therefore consider as my own all modifications and adaptations of the form of the device disclosed herein which fairly fall within the scope of the appended claims.

Having thus described the invention, what I claim is:—

1. A stock muzzle comprising a body open at its one end and being adapted to be slipped over the nose portion of an animal, and means at the other end of the body defining an opening of restricted area through which the animal may graze, said means being adjustable to vary the size of said opening.

2. A stock muzzle comprising a frustrated body open at its one end and adjustable circumferentially to accommodate the nose and jaw portions of animals having heads of different sizes, and means at the other end of the body for restricting the area of the opening through which the animal may graze.

3. A stock muzzle comprising a body including a plurality of rings, each being formed of a single length of wire bent into substantially circular form and having lapped end portions, whereby said rings are adjustable circumferentially, connector wires binding the rings together and holding the latter in spaced apart axial alinement, clamp means releasably holding the lapped portions of the ring forming wires against relative movement from adjusted position, means for holding the body in encircling relation to the nose and jaw portions of the head of an animal, and means connecting with the ring at the outer end of the body for partially obstructing the latter.

4. A stock muzzle comprising a body including a plurality of rings, each being formed of a single length of wire bent into substantially circular form and having lapped end portions, whereby said rings are adjustable circumferentially, connector wires binding the rings together and holding the latter in spaced apart axial alinement, clamp means releasably holding the lapped portions of the ring forming wires against relative movement from adjusted position, means for holding the body in encircling relation to the nose and jaw portions of the head of an animal, spacing thimbles on certain of said rings between each two adjacent binding connectors, and means connecting with the ring at the outer end of the body for partially obstructing the latter.

5. A stock muzzle comprising a body including a plurality of rings, each being formed of a single length of wire bent into substantially circular form and having lapped end portions, whereby said rings are adjustable circumferentially, connector wires binding the rings together and holding the latter in spaced apart axial alinement, clamp means releasably holding the lapped portions of the ring forming wires against relative movement from adjusted position, means for holding the body in encircling relation to the nose and jaw portions of the head of an animal, an additional ring of relatively slight area and being formed of a single piece of wire bent intermediately into circular form and having crossed end portions, means flexibly connecting the last named ring in concentric relation to the ring at the outer end of the body and clamp means for holding the end portions of the wire forming the last named ring in adjusted position in respect to each other, whereby the area of the opening defined by the last named ring may be varied at will.

CHRIS MADSEN RASMUSSEN.